United States Patent [19]

Metildi et al.

[11] 4,063,290
[45] Dec. 13, 1977

[54] VIDEO RECORDING APPARATUS

[75] Inventors: Frederic Howell Metildi, Penfield; Edward Maurice Granger, Rochester, both of N.Y.

[73] Assignee: Eastman Kodak Company, Rochester, N.Y.

[21] Appl. No.: 669,924

[22] Filed: Mar. 24, 1976

[51] Int. Cl.² .................... H04N 5/79; H04N 5/745
[52] U.S. Cl. .................................... 360/9; 358/4; 358/138; 358/147; 360/24; 360/27; 360/32; 360/33
[58] Field of Search ........................ 360/8-9, 360/18-19, 24, 27, 32-33, 36-37; 358/4, 12, 12 T, 133, 138, 141-142, 145-147

[56] References Cited

U.S. PATENT DOCUMENTS

| 2,850,574 | 9/1958 | Kretzmer | 358/133 |
| 3,335,218 | 8/1967 | Johnson | 360/19 |
| 3,392,233 | 7/1968 | Houghton | 360/33 |
| 3,506,780 | 4/1970 | Camaras | 358/145 |
| 3,723,643 | 3/1973 | Suzuki et al. | 360/27 |
| 3,781,463 | 12/1973 | Vanden Bussche | 358/4 |
| 3,821,797 | 6/1974 | Suzuki et al. | 360/24 |

FOREIGN PATENT DOCUMENTS

| 1,263,071 | 3/1968 | Germany | 360/33 |
| 1,219,680 | 1/1971 | United Kingdom | 358/145 |

Primary Examiner—Raymond F. Cardillo, Jr.
Attorney, Agent, or Firm—Robert F. Cody

[57] ABSTRACT

Apparatus for directly recording television signals on a magnetic medium strips out sync and blanking information. Low frequency components of the television signals are time compressed, i.e. frequency shifted, and recorded as a substitute for the stripped-out sync and blanking information. Thus, high frequency components of each video line are recorded, followed by that line's low frequency components, thereby facilitating the playback of low frequency information. The low frequency video information is time compressed sufficiently to provide time, during the time slot which corresponds to sync and blanking information, for the recording of reference signal information. During playback, the reference signal information is employed to set the gain of the playback circuit. In time compressing the low frequency information, the video signal content of a line is sampled at a predetermined rate. Each sample is then quantized for purposes of improving playback signal-to-noise ratio, i.e. the effect of tape modulation, and other, noise is nullified by sample quantization. To assure against the loss during playback of significant low frequency signal information, the quantization bits are rearranged according to their significance, bits of higher significance being recorded in proximity to the reference signal information, and vice versa.

3 Claims, 1 Drawing Figure

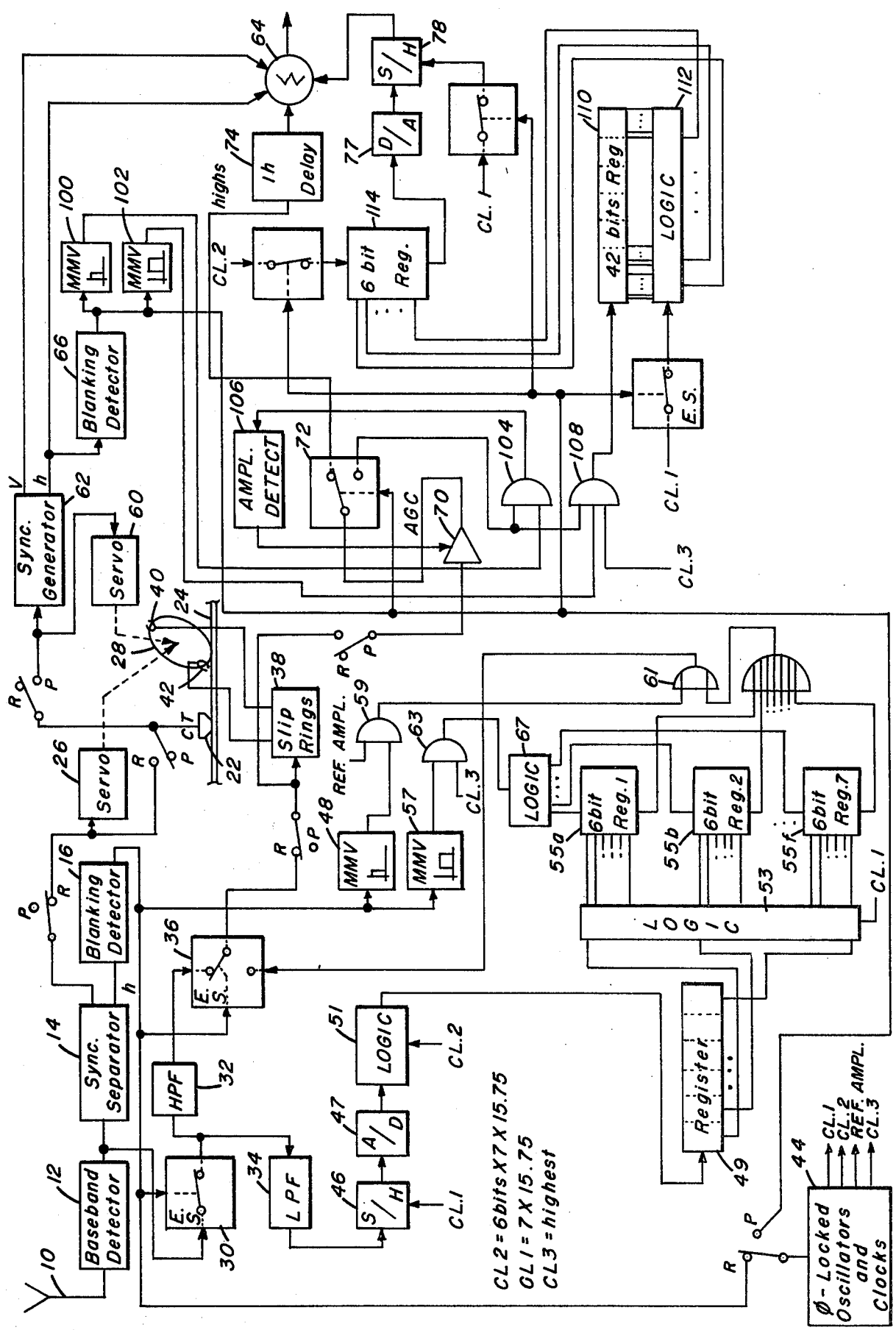

VIDEO RECORDING APPARATUS

CROSS-REFERENCE TO RELATED APPLICATIONS

The following applications are related to each other copending U.S. applications Ser. No. 669,923 and Ser. No. 669,925, filed Mar. 24, 1976:

BACKGROUND OF THE INVENTION

1. Field of the Invention

This invention relates to video recorders, especially those which employ magnetic tape as the recording medium, and which, on playback, feed video signals, say, to the input terminals of a television set. The term "recorder" as used herein shall be interpreted to include playback apparatus as well.

2. Description Relative to the Prior Art

As is known, the video spectrum, as typified by the NTSC baseband signal, contains frequency components from DC to 3 MHz or more, the lower frequencies corresponding at least in part to scene background information, and the higher frequencies corresponding to scene detail information. Because the playback of information recorded on a magnetic medium such as magnetic tape is frequency-dependent (i.e. system response to the playback signal is dependent on the rate of change of flux as seen by a playback head), flux patterns which correspond to low frequency signal components are not easy to detect in the magnetic tape. Prior attempts to record and play back, say, the baseband NTSC signal have, therefore, usually involved the baseband-modulation, during recording, of a relatively high frequency carrier. By so using a baseband-modulated carrier, the playback circuits of the recorder can be tuned to respond to the rapidly changing flux characteristics which correspond to the recorded carrier, with the baseband video signal being then relatively easy to detect and remove from the modulated carrier. While the practice of recording a modulated carrier solves the problem associated with the playback of low frequency information, it does so not without cost: First, because a high frequency carrier must be recovered during playback, the gap in the playback head—for a given speed of the tape past the playback head—must be narrower than for the case of a directly recorded baseband signal, a factor which usually means higher head cost. And, secondly, because the baseband signal, when it modulates the carrier during the recording operation, produces signal sidebands—which must be recorded, and recovered during playback—the spectrum of frequencies to be processed by the recorder (i.e. the recorder bandpass requirements) will be wider than in the case of a baseband recorder. Such bandwidth requirements directly affect information packing density; and, thus, for maximum tape economy for a given amount of video information, the prior practice of recording a modulated carrier leaves much to be desired.

As indicated above, playback of magnetically recorded information depends on the rate of change of flux as seen by a magnetic head. This may suggest that —rather than place the baseband video signal on a carrier as a vehicle for playing back low frequency video—the track containing the recorded video information be widened a bit for cooperation with a widened magnetic playback head, the recorded information being the full video baseband signal. In that way, flux-to-head linkage will increase and, attendantly, so will the playback signal-to-noise ratio (SNR)—which should improve the recoverability of low frequency information. But widening the record track works counter to the goal of "high-packing-density tape usage". Besides, low frequencies, when recorded on a magnetic medium, create flux patterns within the medium which tend to spread out and, to assure that the low frequencies recorded in one track are not played back during the playback of an adjacent track, sizable guard bands between the tracks have to be used, again adversely influencing the efficient use of the magnetic medium.

Aside from the above techniques for recovery of low frequency information from a magnetic recording medium, one might also consider separating the low frequency components of the baseband signal from the higher frequency components, and then recording the low frequencies on a carrier in a separate track. But the use of two tracks to record the baseband information, obviously, is not in the interest of tape efficiency.

U.S. patent applicaton Ser. No. 669,925 filed Mar. 24, 1976 in the name of Edward M. Granger, teaches the splitting of the baseband signal into high and low frequency bands with samples representing the low frequency band being time compressed and "same-track" recorded as a substitute for sync and blanking information. Accompanying the low frequency samples which are recorded are reference pulses which serve not only as a basis for system automatic gain control (AGC), but as a source of system timing.

In U.S. patent application Ser. No. 669,923 filed Mar. 24, 1976 in the names of Rhody, Granger, and Metildi, the system of Ser. No. 669,925 is indicated as being modified by the quantization of the low frequency information samples, prior to recording, thereby to improve the low frequency signal-to-noise ratio during playback.

Both the concepts of Ser. No. 669,923 and Ser. No. 669,925 are incorporated in the video recorder according to the present invention.

SUMMARY OF THE INVENTION

The present invention provides that—since reference (pulse) information is to form a part of the substitute information, and since the signal samples which represent the low frequency information are to be recorded in quantized form—the information bits corresponding to such low frequency information be arranged, and recorded, with the most significant bits of the low frequency samples occurring closest to the reference (pulse) information, the bits of lesser significance occurring progressively farther from the recorded reference information. After playback, the bits are re-arranged to conform with the original sample quantization, and then processed as in Ser. No. 669,923 and Ser. No. 669,925. Such bit-rearranging assures that, if any low frequency information is lost during the playback process, it will most likely be of lesser significance.

The invention will be described with reference to the FIGURE, which is a block diagram of apparatus embodying the invention.

Referring to the FIGURE, a video recorder which is adapted to receive a television signal off an antenna 10 detects the information or baseband signal by means of a detector 12. A circuit 14, for removing the sync information contained in the output of the baseband detector 12, applies its horizontal sync output $h$ to a circuit 16 adapted to produce a signal corresponding to the duration of the blanking signal on which the sync signal rides. The blanking detector 16, typically, will include a counter, a particular count of which is kept in sync with an edge of the sync pulse, and which counter is reset when its count reaches a count corresponding to the duration of the blanking period. The vertical sync pulse output *v* from the sync separator 14 is applied via a RECORD-PLAYBACK switch to a magnetic head 22 for laying down a control track on magnetic tape 24. In addition, the vertical sync pulse *v* is applied to a servo 26 which slaves the speed of a head wheel 28 to the vertical sync pulse rate.

The video information contained in the output of the baseband detector 12 is applied via an electronic switch 30 to high and low pass filters 32, 34, respectively, the switch 30 being actuated (opened), at the horizontal sync rate, by the output of the blanking detector 16. In accordance with the invention, the high frequency content of the baseband signal is applied via an electronic switch 36, and slip rings 38, to magnetic heads 40, 42 which cooperate with and scan the tape 24 in a well-known manner.

At the time that the high frequency content of the baseband signal is recorded, the low frequency content of the baseband signal is processed for recording as a replacement for one part of the sync and blanking information eliminated by actuation of the switch 30. Another part of the eliminated sync and blanking information (per Ser. No 669,925 to Granger) is substituted for by a series of pulses of reference amplitude (and phase, and frequency) which are used for playback AGC. In processing the low frequency output of the filter 34, such output is sampled at a first rate and quantized; then, according to the present invention, the quantization bits are rearranged according to significance: the most significant bits of the samples being grouped together; the next most significant bits of the samples being grouped together; etc. To assure greatest probability of "playback" recovery of low frequency information, the grouped quantization bits are recorded in such a way that the bits of the most significant bit-grouping locate, on the tape 24, nearest the reference pulses, the other bits being located progressively farther from the reference pulses as their respective group-significance decreases. Since (per Ser. No. 669,925 to Granger) the reference pulses establish the gain of the playback side of the FIG. 1 recorder, were a dropout of low frequency information to occur as a result of a drift in gain, the likelihood would be greatest that the low significance bits would be lost before bits of greater significance. Thus, by means of the invention, the effect of a dropout of low frequency information is mitigated.

Assuming the low frequency band extends from DC to 40 KHz, in order to meet the Nyquist criterion and thus avoid aliasing effects, the sampling of low frequency information must be such that the number of samples N taken across a horizontal line of low frequency video information times the horizontal line rate equals at least twice the upper frequency edge (i.e. two times 40 KHz equals 80 KHz) of the low frequency band. And, in this regard, seven samples of low frequency information have been found adequate, a clock 1 (circuit 44) at seven times the line rate frequency of 15.75 KHz being applied to a sample-and-hold circuit 40 to effect such sampling. As soon as a low frequency sample is taken, it is immediately quantized (six bits) by an analog-to-digital converter 47 (A/D) and loaded, via logic 51, into a register 49 by means of a clock 2, the clock 2 being six times the frequency of the clock 1. Then, as the next sample is similarly taken, quantized, and loaded into the register 49, the six bits of the first sample are clocked (by clock 1) in parallel, via logic 53, into six respective registers 55*a* through 55*f*. At the end of each video line, the register 55*a* holds the most significant bits of each of the seven low frequency samples taken during that line of video information; the register 55*b* holds the next most significant bits of each of the seven low frequency samples of that line, etc. After the seventh sample is taken, and quantized, the blanking signal occurs, actuating the switch 36, and triggering a pair of monostable multivibrators 48 and 57. As the multivibrator 48 turns on, it opens a gate 59, allowing reference pulses, say four, to be applied via an OR circuit 61 to the tape 24. Then, as the multivibrator 48 turns off, the multivibrator 57—for the remainder of the blanking period—opens gate 63. With the gate 63 open, a clock 3 successively clocks out, via logic 67, the bits within the registers 55*a* through 55*f*, such clocking-out occurring within the duration that the multivibrator 57 is turned on. The clock 3, like the clocks 1 and 2, is phase-locked to the sync and/or blanking signal and may, for example, be a suitable multiple of the clock 2. In other words, while low frequency samples are slowly taken over the course of a horizontal line, they—as represented by 42 bits within the registers 55*a* through 55*f*—are quickly clocked onto the tape during the relatively brief part of the blanking period characterized by the duty cycle of the multivibrator 57, and thus appear as an easily recoverable high frequency bit rate, at least as far as head-to-tape interaction is concerned.

During playback, reverse signal processing is employed: A servo 60 (which obviously may be the servo 26 operated through suitable switching) drives the head wheel 28 under control of the control track head 22; and vertical and horizontal sync pulses are produced by a sync pulse generator 62 responsive to the control track information (head 22), the sync pulses being applied to a summing circuit 64 adapted to reconstruct the baseband signal. A blanking detector 66 like the detector 16 (or, with suitable switching, the same one) produces switching signals for use in gating the playback information to one of three processing channels. The playback information—comprising, in sequence, a band of high frequency signals occurring over a 1-*h* duration, followed by a series of reference pulses and 42 bits of low frequency information occurring over a "blanking" duration, followed by a band of high frequency signals occurring over a 1-*h* duration, followed by a series of reference pulses and 42 bits of low frequency information occurring over a "blanking" duration, etc.—is applied via slip rings 38, and a playback amplifier 70, to an electronic switch 72. The switch 72 is actuated by the playback blanking signal (circuit 66) and steers the playback information as follows: The high frequency information is applied to a 1-*h* delay 74 which lets the low frequency information—corresponding to such high frequency information, and recorded timewise on the tape after the high frequency information—to catch up in time with the high frequency information. The low frequency information, which was quantized and time compressed for recording during part of the blanking period, and the series of reference pulses which occupies the remainder of the blanking period, are processed in respective channels. Consider first the series of reference pulses: In response to the playback blanking signal, the switch 72 is actuated; and a pair of monostable multivibrators 100, 102 are successively turned on. With the multivibrator 100 turned on, a gate 104 is opened, allowing the reference pulses to be applied to an amplitude detector 106 for control of the gain of the playback amplifier 70. As the multivibrator 100 turns off, the multivibrator 102 turns on, permitting the clock 3 to gate (108) the specially grouped low frequency quantization bits rapidly into a 42-bit register 110. Under control of the clock 1, six bits at a time are logically (112) withdrawn from the register 110 and applied to a six-bit register 114. First, the six bits corresponding to the first low frequency sample are withdrawn from the register 110 and applied to the register 114; then the six bits corresponding to the second low frequency sample are withdrawn and applied to the register 114; etc. The six-bit register 114 is then cyclically unloaded under control of the clock 2. As the bits corresponding to the successive low frequency samples are clocked out of the six-bit register 114, they are converted to analog form (D/A 77), and held in a sample-and-hold circuit 78—the circuit 78 under control of the clock 1 applying its samples to the summing circuit 64 in proper phase with the high frequency signal information with which such samples correlate. With the high and low frequency information, and the sync and blanking information, all appearing at the summing circuit 64 in proper time, the circuit 64 produces a baseband signal which may, for example, be modulated on a carrier and played through a television receiver.

Not only to stabilize system timing, but also to avoid introducing unwanted modulation of the processed low frequency information, the clocks 1, 2, and 3, as indicated above, are all phase-locked to sync (and/or blanking) information, either such information as derived off the air, or such information as derived off the tape.

To be realized is that in the apparatus as described above, bits—and not signal amplitudes—are processed while practicing the invention, "bit-rate variation" being the vehicle for time compressing the low frequency information, whereby such information may be used as a substitute for sync and blanking information. Since bits can be saturation recorded, their occurrence, or not, is all that has to be detected, during playback, thus effectively nullifying the influence of low frequency noise. However, since the above apparatus operates to re-group bits in accordance with their respective significance, and since more significant bits are recorded in proximity to recorded reference information, the probability of good recovery of low frequency information from the tape 24 is greatly enhanced.

The invention has been described in detail with particular reference to preferred embodiments thereof, but it will be understood that variations and modifications can be effected within the spirit and scope of the invention.

What is claimed is:

1. Signal processing apparatus for recording a television signal comprising:
   a. means for dividing said signal into high and low frequency bands;
   b. means for sampling said low frequency band at a predetermined rate;
   c. means for quantizing said samples;
   d. means for rearranging the bits which comprise said quantized samples so that bits of like significance are grouped together;
   e. means for providing reference signal information having a quality characteristic of a reference amplitude; and
   f. means for recording on a magnetic medium in sequence said high frequency band, said reference signal information, and low frequency band signal information which corresponds to the rearranged bits, the low frequency band signal information which corresponds to the bits of greatest significance being recorded in proximity to said reference signal information.

2. The apparatus of claim 1 including:
   a. amplifier means for use in playing back from said magnetic medium said high frequency band, said reference signal information and said signal information which corresponds to said rearranged bits;
   b. means responsive to the playback of said reference signal information for varying the gain of said amplifier means;
   c. means adapted to receive said signal information which corresponds to said rearranged bits to re-group together the bits which correspond to the low frequency samples;
   d. means for converting the signal information which corresponds to the regrouped bits to its analog equivalent, thereby reforming the low frequency band; and
   e. means for combining the played back high frequency band and said reformed low frequency band to reform said television signal.

3. Apparatus for processing an NTSC signal for recording on a magnetic medium comprising:
   a. means for stripping sync and blanking signal information from said NTSC signal;
   b. means for sampling at a predetermined rate the video content of said NTSC signal, thereby isolating the low frequency components of said video content of said NTSC signal;
   c. means for quantizing said samples and for grouping the bits so formed according to their significance;
   d. means for isolating the high frequency components of said video content of said NTSC signal;
   e. means for producing a reference signal having a quality characteristic of a reference amplitude; and
   f. means for applying to said magnetic medium said isolated high frequency components of said video content of said NTSC signal and, as a substitute for said stripped-out sync and blanking signal information, said reference signal followed by said grouped bits.

* * * * *